United States Patent
Callan (10) Patent No.: US 7,458,337 B2
(45) Date of Patent: Dec. 2, 2008

(54) PORTABLE CAT LITTER BOX

(76) Inventor: Patti Callan, 367 Sweetbriar Rd., Memphis, TN (US) 38120

( * ) Notice: Subject to any disclaimer, the term of this patent is extended or adjusted under 35 U.S.C. 154(b) by 262 days.

(21) Appl. No.: 11/492,341

(22) Filed: Jul. 25, 2006

(65) Prior Publication Data

US 2008/0022938 A1 Jan. 31, 2008

(51) Int. Cl.
  *A01K 1/01* (2006.01)
  *A01K 1/03* (2006.01)
(52) U.S. Cl. .............. 119/165; 119/496; 119/453
(58) Field of Classification Search ........... 119/165, 119/170, 166, 482, 483, 496, 497, 453; 280/47.26
See application file for complete search history.

(56) References Cited

U.S. PATENT DOCUMENTS

| | | | | |
|---|---|---|---|---|
| 823,544 | A * | 6/1906 | Parker | 119/453 |
| 2,790,414 | A * | 4/1957 | Rossow | 119/497 |
| 3,618,568 | A * | 11/1971 | Breeden | 119/482 |
| 3,797,461 | A * | 3/1974 | Breeden | 119/482 |
| 3,831,557 | A * | 8/1974 | Elesh | 119/170 |
| 3,865,425 | A * | 2/1975 | French | 296/24.31 |
| 4,096,827 | A | 6/1978 | Cotter | |
| 4,299,190 | A | 11/1981 | Rhodes | |
| 4,852,520 | A * | 8/1989 | Goetz | 119/497 |
| 4,903,637 | A * | 2/1990 | Devault | 119/497 |
| 5,253,612 | A * | 10/1993 | Goetz | 119/496 |
| 5,283,962 | A * | 2/1994 | Humann | 34/202 |
| 5,329,878 | A * | 7/1994 | McCauley | 119/165 |
| 5,329,879 | A * | 7/1994 | Walton | 119/166 |
| 5,349,924 | A * | 9/1994 | Hooper, Jr. | 119/496 |
| 5,701,843 | A * | 12/1997 | Lazides | 119/496 |
| 5,806,461 | A | 9/1998 | Kiera | |
| 5,855,186 | A * | 1/1999 | Larsen et al. | 119/166 |
| 5,964,189 | A * | 10/1999 | Northrop et al. | 119/482 |
| 6,129,365 | A * | 10/2000 | Sadow | 280/47.26 |
| 6,182,612 | B1 | 2/2001 | Ross, Sr. | |
| 6,230,656 | B1 * | 5/2001 | Walach | 119/496 |
| 6,267,080 | B1 * | 7/2001 | Roy | 119/453 |
| 6,298,808 | B1 * | 10/2001 | Crafton et al. | 119/165 |
| 6,427,631 | B1 * | 8/2002 | Ross | 119/496 |
| 6,453,845 | B1 | 9/2002 | Efrati et al. | |
| 6,539,895 | B2 * | 4/2003 | Hoagland | 119/453 |
| 6,662,748 | B1 | 12/2003 | Hanks | |
| 7,036,458 | B1 * | 5/2006 | Stornant | 119/496 |
| 7,070,190 | B2 * | 7/2006 | Sadow | 280/37 |
| 7,152,554 | B2 * | 12/2006 | Crawford | 119/496 |
| 7,243,614 | B1 * | 7/2007 | Byers | 119/482 |
| 7,334,802 | B2 * | 2/2008 | Kaplan | 280/47.26 |
| D566,907 | S * | 4/2008 | Barca | D30/109 |
| 2006/0005777 | A1 | 1/2006 | Galindo et al. | |
| 2007/0157890 | A1 * | 7/2007 | Kaura | 119/496 |
| 2007/0175401 | A1 * | 8/2007 | Young | 119/166 |

* cited by examiner

*Primary Examiner*—Yvonne R. Abbott
(74) *Attorney, Agent, or Firm*—Stetina Brunda Garred & Brucker (57) ABSTRACT

A portable cat litter box comprises a lower portion having a pair of wheels mounted thereon, an upper portion that is attachable to the lower portion in order to collectively define an interior compartment for containing kitty litter, a door pivotally suspended in order to allow ingress and egress of a cat into the interior compartment, and an extension handle pivotally attached to the cat litter box to facilitate transportation thereof and which is lockable to the upper portion during non-use.

21 Claims, 4 Drawing Sheets

PORTABLE CAT LITTER BOX

STATEMENT RE: FEDERALLY SPONSORED RESEARCH/DEVELOPMENT

Not Applicable

BACKGROUND

The present invention relates generally to cat litter boxes and, more particularly, to a uniquely configured cat litter box that is specifically adapted to increase the ease and convenience by which the cat litter box may be transported and relocated.

In keeping pets such as cats inside a dwelling such as a home, apartment or condominium, it is necessary for the pet owner to provide a tray or a cat litter box within which the animal may attend to its physiological needs. Such cat litter boxes generally contain a layer of particulate matter such as kitty litter which is typically an absorbent material that is also designed to minimize odors emanating from the cat litter box.

It is necessary to replace the kitty litter on a periodic basis in order to avoid the build up of noxious fumes over time. Furthermore, it is typically necessary to replace the kitty litter when the waste-retaining capability of the kitty litter has been exceeded. Depending on the number of animals or cats that use the cat litter box, the frequency with which the spent kitty litter must be replaced with fresh kitty litter may be on a weekly basis. The disposal of the spent or soiled kitty litter is an unpleasant and inconvenient task due to the close proximity between the pet owner and the kitty litter as required when removing the soiled kitty litter and replacing it with fresh kitty litter.

In addition to the unpleasantries associated with the noxious odors emanating from the cat litter box, the mass or weight of the spent kitty litter presents additional inconveniences and difficulties for the pet owner in disposing of the kitty litter. More specifically, the kitty litter is typically comprised of a particulate clay compound which, when soiled, can be quite heavy when lifted as a unit by means of a plastic garbage bag liner which typically lines the cat litter box.

Handling of the soiled kitty litter also presents health issues due to the risk of toxoplasmosis which the soiled kitty litter poses to pregnant women. Furthermore, a certain portion of kitty litter is known to contain relatively fine particles which can escape into the surrounding environment such as may occur when the soiled kitty litter is replaced. Replacement of the kitty litter with fresh kitty litter typically entails accessing the liner (i.e., trash bag) which contains the soiled kitty litter, lifting the liner such out of the cat litter box and carrying the litter-filled garbage bag to a garbage can or other appropriate waste receptacle.

Unfortunately, the soiled kitty litter contained within the liner may be quite heavy and may approach ten to twenty pounds in weight. Furthermore, because cat litter boxes are typically located at floor level for convenient access by the cat, removal of soiled litter from the cat litter box requires that the pet owner bend over and lift the liner up and out of the cat litter box. The pet owner must then carry the litter-filled liner to an appropriate waste receptacle for depositing.

The picking up and carrying of the liner filled with soiled kitty litter poses a health risk to certain individuals with back problems. In addition, disposal of the litter-filled liner may be difficult or impossible for those who lack sufficient strength to carry the liner from the cat box to an appropriate waste receptacle. Such waste receptacles are typically located outside the dwelling unit in order to avoid unpleasantries such as breathing of the noxious fumes that may emanate therefrom if the soiled kitty litter were disposed of in an indoor waste receptacle.

As can be seen, there exists a need in the art for a means for moving the soiled kitty litter from the cat litter box for disposal thereof. Furthermore, there exists a need in the art for a cat litter box which provides a convenient means by which the soiled kitty litter may be moved. Additionally, there exists a need in the art for a cat litter box which is specifically configured for ease in transporting an otherwise bulky and somewhat heavy item. Finally, there exists a need in the art for a cat litter box which is simple in construction and convenient for use by a pet owner.

BRIEF SUMMARY

The present invention specifically addresses and alleviates the above mentioned needs associated with cat litter boxes of the prior art by providing a portable cat litter box having an extension handle integrated therewith in order to facilitate efficient and convenient transportation and maneuvering of the cat litter box during its operative use.

In its broadest sense, the portable cat litter box of the present invention comprises a lower portion releasably attachable to an upper portion, an opening formed in the upper portion and having a door pivotable in relation thereto, a pair of lift handles mounted on the upper portion, and an elongate extension handle pivotally connected to the upper portion and being specifically configured to be outwardly pivotable in order to facilitate transportation and maneuverability of the cat litter box.

The lower portion defines an enclosure that is open on top and which comprises a bottom wall, a pair of opposing side walls and a pair of opposing end walls interconnecting the side walls. The enclosure is adapted to contain kitty litter therewithin and may further include a liner such as a garbage bag within which a layer of the kitty litter may be provided. A pair of wheels may be rotatably mounted to the lower portion on respective ones of the side walls. The wheels may be configured to be received within wheel wells formed in the lower portion so that an outer surface of the each of the wheel is substantially flush with the side wall of the lower portion. A pair of leg members may be formed on the lower portion and may extend downwardly from the bottom wall thereof. The pair of leg members may be located at an end of the cat litter box opposite the end having the wheels. The leg members are preferably sized such that the lower portion is oriented substantially level when the cat litter box is supported on a level surface.

The upper portion defines an enclosure that is open on a bottom thereof and which is preferably removably attachable to the lower portion such that the top and bottom portions collectively define an interior compartment. The upper portion comprises a top wall and a pair of opposing side walls interconnected by a pair of opposing end walls. One of the end walls may have an opening formed therein to facilitate ingress and egress into the interior compartment by a cat. A door may be pivotally suspended on the opening and is preferably configured to pivot inwardly and outwardly relative to the opening.

The cat litter box may further include a pair of lift handles pivotally mounted on the top wall and which are sized and configured to facilitate lifting of the cat litter box. The lift handles are preferably centered along a length of the top wall and are preferably disposed on opposing sides of a centerline of the upper portion. Optionally, the lift handles may be configured to be lockable to the top wall in order to prevent interference during pivoting of the upper portion away from the lower portion such as may be required when replacing the kitty litter in the lower portion.

The cat litter box may further include the extension handle which is preferably pivotally connected to the top wall at an end of the cat litter box opposite the end having the wheels. The extension handle is preferably pivotable against the top wall and is oriented in substantial alignment with the centerline thereof and lockable thereagainst during non-use. In its operative state, the extension handle is preferably sized and configured to be outwardly pivotable away from the top wall such that a user may grasp the extension handle in any desired angular orientation in order to facilitate transportation of the cat litter box via the wheels. The extension handle may be pivotable through an angle of at least 180 degrees about a pivot axis oriented parallel to the top wall. In addition, the extension handle may be further configured to be rotatable through a 360 degree arc about a swivel axis that is oriented perpendicularly relative to the top wall.

Additional features of the cat litter box include a scoop holder which may optionally be mounted on a side wall of the upper portion and which is preferably sized and configured to support or mount a litter scooping device thereon. In addition, the upper portion preferably includes a plurality of vent openings integrally formed in the top wall in order to allow for ventilation of the interior compartment with the atmosphere. A ramp element may also be provided and is preferably removably mountable to the cat litter box and extends outwardly from the opening in order to provide a convenient means for entry and exit of the cat litter box.

BRIEF DESCRIPTION OF THE DRAWINGS

These and other features and advantages of the various embodiments disclosed herein will be better understood with respect to the following description and drawings in which like numbers refer to like parts throughout and in which.

DETAILED DESCRIPTION

Referring now to the drawings wherein the showings are for purposes of illustrating preferred embodiments of the present invention and not for purposes of limiting the same, shown in FIGS. 1-6 is a portable cat box 10 that is specifically adapted to provide improved transportability and convenience in moving the cat box.

In its broadest sense, the portable cat litter box 10 comprises a lower portion 12 removably attachable to an upper portion 14, a door 66 pivotally suspended above an opening 64 formed in the upper portion 14, at least one lift handle 44 mounted on top of the cat litter box 10 and an elongate extension handle 50 pivotally attached to the cat litter box 10 and being configured to facilitate rolling movement thereof. Advantageously, the extension handle 50 is lockable against the cat litter box 10 to avoid interfering with removal of the upper portion 14 as is required during replacement of kitty litter.

Furthermore, the extension handle 50 is specifically adapted to be pivotable through at least an angle of about 180 degrees and may optionally include a telescopic mechanism 52 such that the extension handle 50 is suitable for use by a variety of persons (i.e., pet owners) of varying height in order to improve convenience and flexibility for transporting the cat litter box 10. The lift handle 44 may optionally be configured to be lockable against the cat litter box 10 during non-use in order to facilitate removal of the upper portion 14 from the lower portion 12.

The lower portion 12 defines an enclosure 18 which, as was earlier mentioned, may include a liner (not shown) such as a garbage bag to contain kitty litter so as to minimize or eliminate direct contact with the kitty litter during replacement thereof. In this regard, it is contemplated that the liner may be initially installed in the lower portion 12 with sides of the liner extending upwardly and overlapping an open top of the lower portion 12. In such an arrangement, the pet owner may simply grasp the overlapping portions of the liner and lift the liner containing the soiled kitty litter out of the lower portion 12 for disposal thereof.

As shown in FIG. 1-5, the enclosure of the lower portion 12 is defined by a bottom wall 20 and having a pair of upwardly extending opposing side walls 24 and a pair of opposing end walls 26 interconnecting the side walls 24. The enclosure 18 is specifically adapted to contain kitty litter therewithin after the liner is preferably first installed in the lower portion 12. Although the lower portion 12 is shown as a generally rectangularly shaped configuration, it is contemplated that various other shapes and sizes may be provided.

For example, the lower portion 12 may have an oval tub-like shape or other alternative shapes and which the upper portion 14 is preferably adapted to mate therewith. In this regard, it is contemplated that the lower portion 12 may be provided with a mating lip 32 extending around a top of the enclosure 18 and which is sized and configured complementary to a corresponding mating lip 32 formed on the upper portion 14. Preferably, the upper portion 14 is removably attachable to the lower portion 12 which may be by means of a combination of latches 28 on one end of the cat litter box 10 and a pair of finger hinges 30 or other suitable hinging devices on an opposite end of the cat litter box 10 as will be described in greater detail below.

Figures 1, 1A:
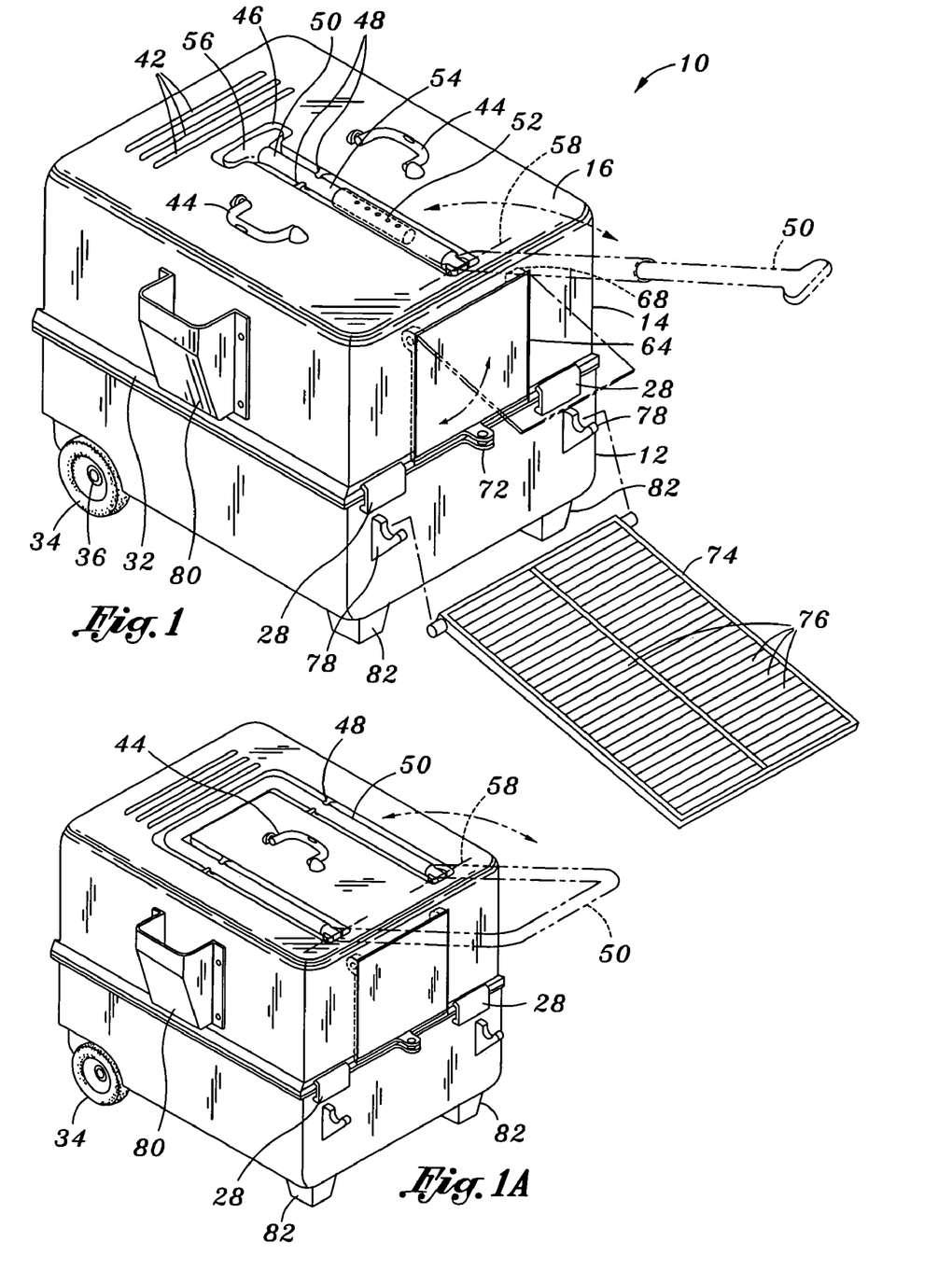
FIG. 1 is a perspective view of a cat litter box of the present invention illustrating an upper portion mated to lower portion and having an extension handle pivotally and swivelably mounted to the upper portion.
FIG. 1a is a perspective view of the cat litter box illustrating the extension handle in a U-shaped configuration.
Figure 5:
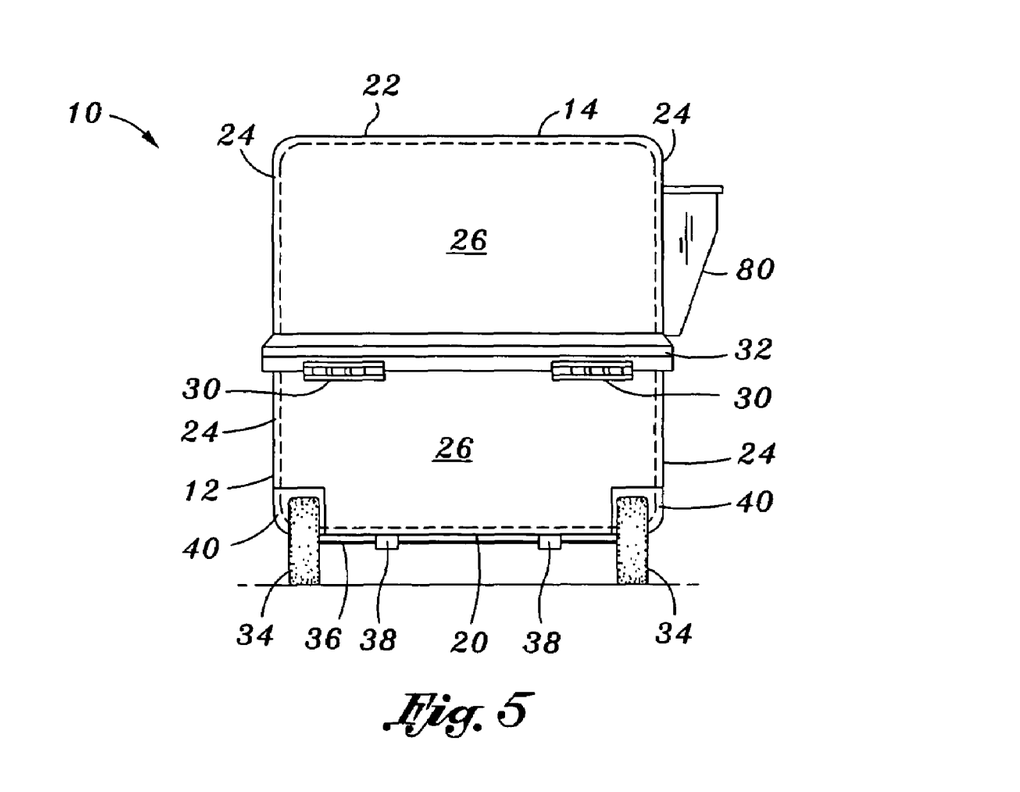
FIG. 5 is an end view of the cat litter box illustrating a finger hinge for pivotally mounting the upper portion to the lower portion.

Mounted on an end of the lower portion 12 is a pair of wheels 34. As can be seen in FIGS. 1, 3 and 5, the pair of wheels 34 are preferably rotatably mounted on opposing side walls 24 of the lower portion 12 and are preferably located adjacent one of the opposing ends of the cat litter box 10. In this regard, the side walls 24 of the lower portion 12 may include wheel wells 40 extending laterally thereinwardly and within which the wheels 34 may be mounted. Preferably, the wheels 34 and wheel wells 40 are sized and configured such that outer surfaces of each of the wheels 34 is substantially flush with the lower portion 12 side wall 24 when the wheels 34 are mounted within the wheel wells 40.

Figure 6:
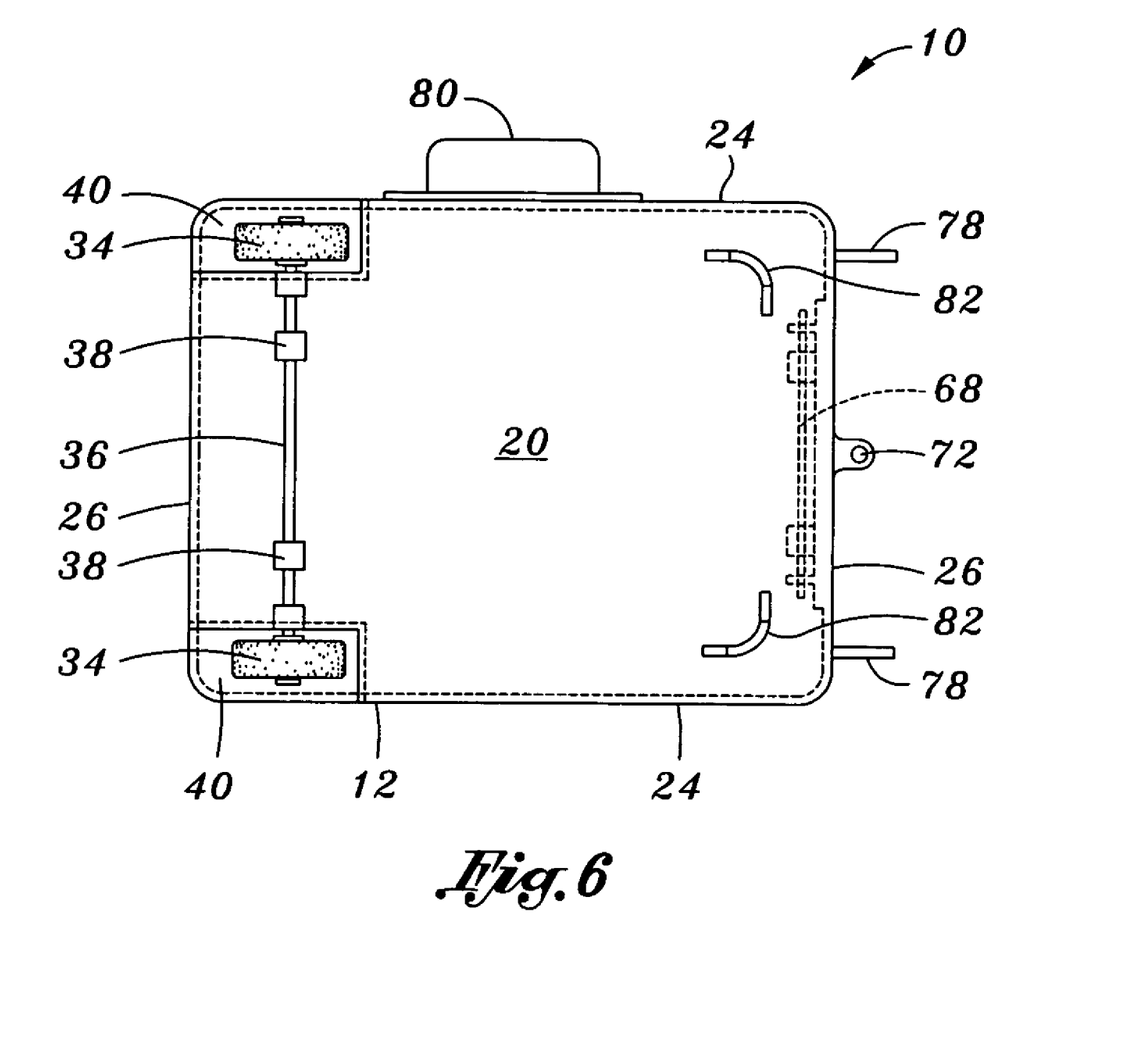
FIG. 6 is a bottom view of the cat litter box illustrating a pair of wheels rotatably mounted within wheel wells formed in the lower portion and further illustrating a pair of leg members disposed on an end of the cat litter box opposite from the wheels.

The wheels 34 may be mounted using an axle 36 and a pair of axle mounts 38 disposed on the bottom of the lower portion 12 as shown in FIG. 6. The axle mounts 38 may be integrally formed with the lower portion 12 such as by injection molding as a unitary structure. However, it is contemplated that a variety of alternative suitable methods may be utilized for mounting the axle 36. Furthermore, each of the wheel wells 40 may be individually rotatably mounted to respective side walls 24 of the lower portion 12. Preferably, the wheels 34 are sized to extend below the bottom wall 20 such that the lower portion 12 is supported above the surface upon which it rests.

At least one and, more preferably, a pair of leg members 82 may extend downwardly from the bottom wall 20 of the lower portion 12 and may be located adjacent respective ones of the side walls 24 at an end of the cat litter box 10 opposite the end having the wheels 34 mounted thereto. The leg members 82 are preferably sized (i.e., are of suitable length) such that the lower portion 12 is oriented substantially level when the cat litter box 10 is supported on a level surface. It is contemplated that the leg members 82 may be integrally formed with the lower portion 12 such as by injection molding of a plastic material such that the lower portion 12 and leg members 82 are formed as a unitary structure.

As shown in the figures, the upper portion 14 may be removably and/or pivotally connectable to the lower portion 12. The upper portion 14 defines an enclosure 18 that is open on a bottom thereof and which is adapted to mate with the lower portion 12 at a top thereof. In this manner, the upper and lower portions 14, 12 collectively define the interior compartment 16 of the cat litter box 10. The upper portion 14 may be configured similar to the lower portion 12 in that the upper portion 14 may include a top wall 22 having a pair of opposing side walls 24 interconnected by a pair of opposing end walls 26. Although providable in alternative configurations, the upper portion 14 is shown as a generally rectangular shaped member which may generally be provided at a greater height than that of the lower portion 12. In this regard, a preferably geometric arrangement is for the cat litter box 10 to have a width of about 15 inches and an overall length of about 20 inches with a height of about 20 inches.

As was earlier mentioned, the cat litter box 10 is supported by a pair of wheels 34 on opposing sides of the lower portion 12. Such wheels 34 may be of any diameter and any configuration and are preferably of a diameter of about three inches. The wheels 34 are rotatably mounted on the axle 36 and are restrained thereon such as by a push-on retainer. The upper portion 14 may preferably have a height of about nine inches as compared to a seven inch height for the lower portion 12. Due to the additional height provided by the wheels 34 as well as the added height due to the lift handle 44 and extension handles 50 mounted on the top of the upper portion 14, the overall height of the cat litter box 10 is about 20 inches. As is apparent, variations in the geometry of the upper and lower portions 14, 12 as well as differences in the diameter of the wheels 34 will change the overall dimensions of the cat litter box 10.

Referring to the figures, the upper portion 14 can be seen provided with an opening 64 formed in one of the end walls 26 for ingress and egress of a pet into and out of the interior compartment 16. A door 66 may be pivotally suspended above the opening 64 and is therefore attached to one of the end walls 26 of the upper portion 14. Pivotal attachment of the door 66 may be provided by a variety of means including a door hinge 68 as is shown in the figures. However, it is contemplated that in alternative embodiments, the door 66 may be hinged along one of its other edges such as its right or left edges.

Preferably, the door 66 is sized and configured to be complementary to the opening 64 formed in the end wall 26 of the upper portion 14. Additionally, the door 66 is configured to pivot inwardly and outwardly relative to the opening 64. Furthermore, although the door 66 is shown as being formed on the end wall 26 of the upper portion 14, it is contemplated that the door 66 may be located on any of the other sides of the upper portion 14 such as one of the side walls 24 or an opposing one of the end walls 26. However, as shown in the figures, the door 66 is located on an end of the cat litter box 10 opposite that end upon which the wheels 34 are mounted.

Optionally, the cat litter box 10 may further comprise a scoop holder 80 mounted thereon. More specifically, as shown in the figures, the scoop holder 80 may be mounted on one of the side walls 24 of the upper portion 14 and is preferably sized and configured to support a litter scooping device such as may be used when replacing the kitty litter. Attachment of the scoop holder 80 to the cat litter box 10 may be facilitated by means of a peripheral flange extending around side walls 24 of the scoop holder 80 in order to facilitate abutting mating of the flange with an outer surface of the side wall 24 or end wall 26. Although configurable in a variety of configurations such as the bucket-like arrangement shown in FIGS. 1-4, it is contemplated that the scoop holder 80 may be configured as a hook upon which a litter scooping device may be hung. Alternatively, the scoop holder 80 may be provided in any suitable arrangement complementary to the litter scooping device which it is intended to support.

Also shown in the figures is at least one, and, more preferably a pair of lift handles 44 pivotally mounted on the top wall 22 of the upper portion 14 and which are sized and configured to facilitate lifting of the cat litter box 10. Furthermore, the lift handles 44 may be configured to be lockable against the top wall 22 of the upper portion 14 during non-use in order to avoid interfering with removal of the upper portion 14 from the lower portion 12 such as may be required when replacing the kitty litter.

The lift handle 44 may be provided as a single lift handle 44 mounted in a suitable location on the top wall 22. Preferably, however the lift handles 44 comprise a pair of lift handles 44 mounted on opposing sides of a centerline 62 extending down a length of the top wall 22. In addition, the lift handles 44 are preferably positioned so as to approximate the vertical center of gravity of the cat litter box 10 in its filled (i.e., with kitty litter) or unfilled states. Locking of the lift handles 44 to the top wall 22 may be facilitated through the integration of a locking mechanism 48 into the top wall 22. Such locking mechanism 48 may simply comprise an outwardly extending feature formed integrally with the upper portion 14 and which contains the lift handle 44 securely against the top wall 22 during non-use.

It is contemplated that the lift handles 44 may each be pivotally mountable and being received into a handle recess 46 formed in the top wall 22. Therefore, the handle recess 46 for each of the lift handles 44 is preferably shaped complementary to the lift handle 44 such that the lift handles 44 are generally flush and do not protrude above the planar surface of the top wall 22 during non-use. In this regard, a user may pivot the lift handles 44 outwardly during operative use thereof (such as during lifting of the cat litter box 10) and neatly stow the lift handles 44 in their respective indentations or handle recesses 46 during non-use such that other items may be easily stacked on top of the cat litter box 10 such as may occur during storage of the cat litter box 10.

The cat litter box 10 may further include at least one and, more preferably, a plurality of vent openings 42 that are preferably also integrally formed thereinto. More specifically, as shown in FIG. 1, a plurality of vent openings 42 may be integrally formed into the top wall 22 of the upper portion 14 and are specifically configured to allow ventilation of the interior compartment 16 to the atmosphere. As can be seen in the figures, the vent openings 42 are arranged as a series of spaced parallel vent openings 42 integrally formed into the top wall 22. Optionally, it is contemplated that the vent openings 42 may be adapted to receive odor absorbing filters in order to reduce noxious fumes emanating from the interior compartment 16. Although shown as being formed on the top wall 22 of the upper portion 14, it is contemplated that the vent openings 42 may be formed in any location on the cat litter box 10 such as along any of the end walls 26 and/or side walls 24 and/or top wall 22 of the upper portion 14.

Mating or attachment of the upper portion 14 to the lower portion 12 may be facilitated through the use of at least one and, more preferably, a pair of latches 28 disposed on one of the ends of the cat litter box 10. As shown in the figures, the latches 28 may be mounted permanently on the lower portion 12 adjacent the mating lip 32 and are specifically configured to engage a mating feature formed on the mating lip 32 of the upper portion 14. Although shown as being formed on one of the ends of the cat litter box 10, it is contemplated that the latches 28 may be formed on any area of the mating lip 32 such as on the sides and/or ends of the cat litter box 10. The latches 28 are specifically configured to releasably clamp the upper portion 14 to the lower portion 12 in order to securely retain the lower portion 12 to the upper portion 14.

On an opposing end of the cat litter box 10, a pair of finger hinges 30 may be mounted in order to allow pivotal movement of the upper portion 14 away from the lower portion 12 to expose the interior compartment 16 such as may be required when replacing the kitty litter and/or liner. In this regard, it is contemplated that the finger hinges 30 may be comprised of a two-part system wherein complementary hinge components are permanently formed into the upper and lower port ions 14, 12 adjacent the mating lip 32.

Also included with the cat litter box 10 is an elongate extension handle 50 that is preferably pivotably attached to the cat litter box 10 and which is specifically sized and configured to facilitate rolling movement and transportation of the cat litter box 10 in a convenient manner. The extension handle 50 is preferably configured to be lockable to the top wall 22 during non-use. Preferably, the extension handle 50 is comprised of a single unitary arm portion 54 that is pivotally mounted to the top wall 22 of the cat litter box 10 at an end thereof that is opposite the end having the wheels 34. A gripping portion 56 may be formed on a free end of the arm portion 54 and is preferably sized and configured to anatomically conform to that of a human hand in order to facilitate gripping thereof.

The extension handle 50 is preferably configured to be telescoping due to the optional inclusion of a telescopic mechanism 52 into the arm portion 54 such that the extension handle 50 may be extended to the appropriate length suitable for a variety of users regardless of differences in height and arm reach. As was earlier mentioned, the extension handle 50 is preferably pivotally attached to the top wall 22 and is oriented in substantial alignment with the centerline 62 of the top wall 22 and is lockable thereagainst during non-use.

During operation, the extension handle 50 is configured to be outwardly pivotable from the top wall 22 and, in this regard, is preferably capable of a rotational angle of at least 180 degrees about a pivot axis 58 oriented parallel to a plane defined by the top wall 22. The extension handle 50 may be rotated at any angle relative to the top wall 22 according to the desired movement inputs from the user.

Figure 2:
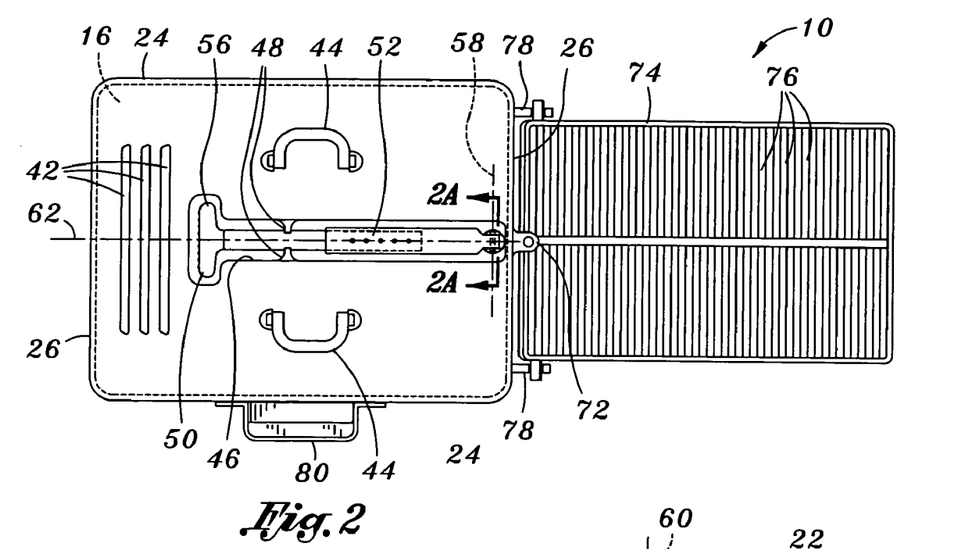
FIG. 2 is a top view of a cat litter box illustrating a pair of lift handles and the extension handle secured to a top wall of the upper portion of the cat litter box.
Figures 2A, 3:
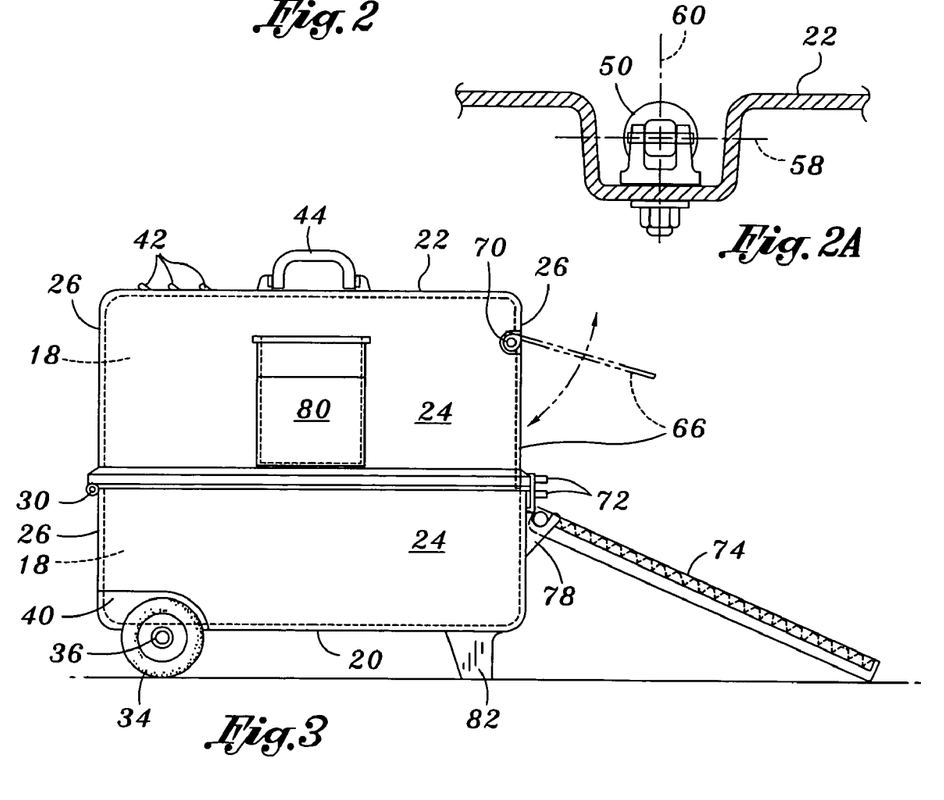
FIG. 2a is a cross-sectional view taken along line 2a-2a of FIG. 2 and illustrating a pivot axis and a swivel axis about which the extension handle may move.
FIG. 3 is a side view of the cat litter box illustrating a ramp element removably mounted to the lower portion.
Figure 4:
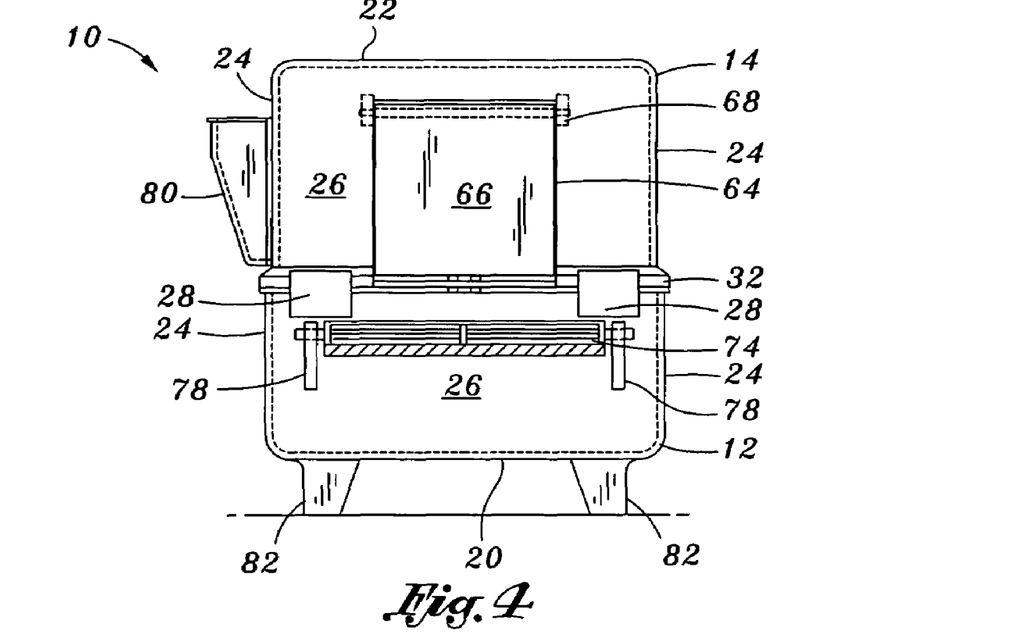
FIG. 4 is an end view of the cat litter box illustrating a door pivotally mounted thereto.

Furthermore, as shown in FIGS. 1, 2 and 2a, the extension handle 50 may be configured to be swivelably attached to the cat litter box 10 such that the extension handle 50 may be rotatable through a 360 degree angle about a swivel axis 60 oriented perpendicularly relative to the top wall 22 as shown in the figures. In this manner, not only is the extension handle 50 pivotable relative to the top wall 22 in a vertical plane, but the extension handle 50 is rotatable in a horizontal direction such that the handle 50 may be pulled at any angle relative to the cat litter box 10 to facilitate maneuvering thereof. The attachment of the extension handle 50 in order to provide pivoting and rotating motion thereof may be by means of a clevis fitting mounted to the top wall 22 via an extension stud extending through the top wall 22. The clevis fitting may include a pair of low friction washers or other suitable material so that the extension handle 50 is easily pivotable in a horizontal plane regardless of its angular orientation relative to the top wall 22.

The extension handle 50 is also preferably configured to be lockable against the top wall 22 during non-use, and in this regard, may include a locking mechanism 48 similar to that described above for the lift handles 44. The locking mechanism 48 provides a means to secure the extension handle 50 against the upper portion 14 when the upper portion 14 is removed from the lower portion 12 such as during replacement of the kitty litter. The extension handle 50 may be disposed in non-protruding relationship to the planar surface of the top wall 22.

Referring to FIG. 1A, in a further embodiment, the extension handle 50 may be configured as a U-shaped entity comprising a pair of arm portions 54 interconnected by a gripping portion 56. As shown in FIG. 1A, the arm portions 54 are preferably pivotably mounted to the top wall 22 in the same manner as that described above for the unitary configuration of the extension handle 50 of FIG. 1. However, when provided in the U-shaped configuration, the extension handle 50 is not capable of pivotable movement and is only capable of angular rotatable movement relative to the top wall 22.

The U-shaped configuration of the extension handle 50 may provide improved maneuverability of the cat litter box 10 in certain situations. Locking mechanisms 48 may be provided in order to secure the U-shaped extension handle 50 to the top wall 22 in the manner similar to that described above for the lift handles 44. It is contemplated that the U-shaped extension handle 50 is pivotally mounted to the top wall 22 at an end of the cat litter box 10 opposite the end having the wheels 34. However, the extension handle 50 may be pivotally mounted at any location along the top wall 22.

Optionally, the cat litter box 10 may further comprise a ramp element 74 that is configured to be removably mountable to the cat litter box 10 adjacent the opening 64 as shown in FIGS. 1-3. The ramp element 74 may be pivotally mounted to the lower portion 12 adjacent the opening 64 and having a free end which extends outwardly away from the opening 64 and which preferably provides a more convenient entry into the interior compartment 16 from the floor level. Apertures such as perforations 76 or slots may be formed in the ramp element 74. The perforations 76 are preferably sized to the size of the particulates that make up the kitty litter. In this manner, kitty litter that a cat may track out of the cat litter box 10 may be dislodged from the animal's feet when the cat moves along the ramp element 74 when exiting the cat litter box 10. As can be seen in the figures, the ramp element 74 may be removably supported by a pair of hingeable ramp supports 78 extending outwardly from the lower portion 12 of the cat litter box 10.

Referring to FIG. 1, the door 66 may include a door hasp 72 formed on a lower portion 12 of the door 66 and which is configured to be engageable to a mating door hasp 72 formed on the side wall 24 of the lower portion 12. In this manner, the door 66 may be engaged or locked in a closed position such as may be required during removal of the upper portion 14 from the lower portion 12 which may also be required during transporting of the cat litter box 10 in order to avoid spilling of the kitty litter contained inside.

It is contemplated that the cat litter box 10 may be formed of a polymeric or plastic material such as by injection molding. In this regard, a majority of the above-described features which can be incorporated into the cat litter box 10 may be provided by injection molding such that the upper and lower portions 14, 12 can incorporate a majority of the features. However, the cat litter box 10 may be fabricated from any suitable material.

In operation, a pet owner may initiate use of the cat litter box 10 by first removing the upper portion 14 from the lower portion 12 by unhinging the latches 28 and pivoting the upper portion 14 away from the lower portion 12 to expose the interior compartment 16. Thereafter, a liner such as a garbage bag may be laid into the enclosure 18 defined by the lower portion 12. Kitty litter may then be spread into the lower portion 12 to a sufficient layer thickness. The liner may be overlapped over an upper edge of the lower portion 12 such that upon replacing the upper portion 14 to the lower portion 12, the liner is clamped therebetween in order to prevent inadvertent dislodgement during use by the cat.

Transporting the cat litter box 10 to the appropriate location may be facilitated by employing the extension handle 50. In this regard, the user may grasp the gripping portion 56 of the extension handle 50 in order to disengage the extension handle 50 from the locking mechanism 48. The extension handle 50 may then be rotatably moved to the appropriate location and, if a telescopic mechanism 52 is provided, may be extended outwardly to the appropriate length suitable for the user's height and arm reach. The user may then pull or push on the extension handle 50 as desired in order to transport and maneuver the cat litter box 10 into the desired location in the living dwelling. For example, the user may pull the extension handle 50 in order to move the cat litter box 10 from a bedroom to an area where the soiled kitty litter may be disposed of such as, for example, a trash bin or other suitable waste receptacle located in a garage.

After moving the cat litter box 10 to the appropriate location, the user may access the liner by simply unclipping the latches 28 and upwardly rotating the upper portion 14 relative to the lower portion 12 in order to expose the interior compartment 16. After grasping the liner, the user may lift out the litter-filled liner for disposal into the waste receptacle. In this manner, the need to lift and carry the litter-filled liner from the cat litter box 10 to a waste receptacle is eliminated. A new liner may then be replaced into the lower portion 12 with the upper walls of the liner overlapping the mating lip 32.

Following replacement of the liner and installing a fresh layer of kitty litter, the user may then lower the upper portion 14 back onto the lower portion 12 and re-engage the latches 28. Pivotally moving the upper portion 14 relative to the lower portion 12 may be facilitated through the use of the lift handles 44 which may be disengaged from a locking mechanism 48 during operative use followed by reengaging the lift handles 44 during non-use. The user may transport the cat litter box 10 back to any desired location in the living dwelling by maneuvering the extension handle 50 after which the extension handle 50 may be locked to the top wall 22 via the top locking mechanism 48.

The description of the various embodiments of the present invention is presented to illustrate preferred embodiments thereof and other inventive concepts may be otherwise variously embodied and employed. The appended claims are intended to be construed to include such variations except insofar as limited by the prior art.

What is claimed is:

1. A portable cat litter box, comprising:
    a lower portion defining an enclosure being open on a top thereof and comprising a bottom wall, a pair of opposing side walls and a pair of opposing end walls, the enclosure being adapted to contain kitty litter therewithin;
    a pair of wheels rotatably mounted on opposing side walls of the lower portion at one of opposing ends of the cat litter box;
    an upper portion defining an enclosure being open on a bottom thereof and being removably attachable to the lower portion such that the top and bottom portions collectively define an interior compartment, the upper portion having a top wall, a pair of opposing upper side walls and a pair of opposing upper end walls interconnecting the side walls, the upper portion end wall opposite the pair of wheels having an opening formed therein;
    a pair of lift handles pivotally mounted on the top wall and being sized and configured to facilitate lifting of the cat litter box, the pair of lift handles being generally centered along a length of the top wall and being disposed on opposing sides of a centerline of the top wall, the lift handle being configured to be lockable to the top wall during non-use; and
    an elongate extension handle pivotally attached to the top wall at an end of the cat litter box opposite the end having the wheels mounted thereto; the extension handle being pivotal against the top wall and being oriented in substantial alignment with the centerline and lockable against the top wall during non-use, the extension handle being sized and configured to facilitate rolling movement of the car litter box.

2. The cat litter box of claim 1 further comprising a scoop holder mounted on one of the side walls of the upper portion.

3. The cat litter box of claim 2 wherein the scoop holder comprises a scoop housing open on top and being sized and configured to support the litter scoop therewithin, the scoop housing having side walls and including a peripheral flange extending around the side walls for disposal thereof against the upper portion side wall.

4. The cat litter box of claim 1 further comprising a ramp element removably mountable to the cat litter box adjacent the opening.

5. The cat litter box of claim 4 wherein the ramp element includes a plurality of perforations sized to allow kitty litter to pass therethrough.

6. The cat litter box of claim 1 wherein the extension handle is configured to be telescoping.

7. The cat litter box of claim 1 wherein the extension handle is U-shaped and comprising a pair of arm portions interconnected by a gripping portion, the arm portions being pivotally mounted to the top wall at an end of the cat litter box opposite the end having the wheels mounted thereto.

8. The cat litter box of claim 1 wherein the extension handle comprises a single elongate arm portion pivotally connected at one end thereof to the top wall and having a T-shaped gripping portion disposed on an opposite end of the arm portion.

9. The cat litter box of claim 8 wherein the top wall includes a handle recess formed therein and being shaped complementary to the extension handle for receipt therewithin during non-use.

10. The cat litter box of claim 9 wherein the cat litter box includes a pair of lift handles pivotally mounted to the top wall on opposing sides of the handle recess.

11. The cat litter box of claim 1 wherein the extension handle is pivotable through an angle of at least one-hundred-eighty degrees about a pivot axis oriented parallel to a plane defined by the top wall.

12. The cat litter box of claim 1 wherein the extension handle is swivelably attached to the cat litter box.

13. The cat litter box of claim 12 wherein the extension handle is configured to be rotatable through a three-hundred-sixty degree angle about a swivel axis oriented perpendicularly relative to the top wall.

14. The cat litter box of claim 1 further comprising:
a door hasp formed on the lower portion side wall;
wherein the door includes a mating door hasp configured to be engageable to the lower portion door hasp to secure the door in a closed position.

15. The cat litter box of claim 1 further comprising:
a spaced pair of latches interconnecting respective end walls of the top and bottom portions;
a spaced pair of finger hinges pivotally interconnecting the top and bottom portions and being disposed on the end walls at an end of the cat litter box opposite the latches.

16. A portable cat litter box, comprising:
a lower portion defining an enclosure being open on a top thereof and comprising a bottom wall, a pair of opposing side walls and a pair of opposing end walls, the enclosure being adapted to contain kitty litter therewithin, each one of the side walls including a wheel well extending laterally thereinwardly;
a pair of wheels rotatably mounted to the lower portion in respective ones of the wheel wells and being sized and configured such that outer surfaces of each of the wheels is substantially flush with the lower portion side wall;
a pair of leg members extending downwardly from the bottom wall of the lower portion and being located adjacent respective ones of the side walls at an end of the cat litter box opposite the end having the wheels mounted thereto, the leg members being sized such that the lower portion is oriented substantially level when the cat litter box is supported on a level surface;
an upper portion defining an enclosure being open on a bottom thereof and being hingedly removably attachable to the lower portion such that the top and bottom portions collectively define an interior compartment, the upper portion having a top wall, a pair of opposing side walls and a pair of opposing end walls interconnecting the side walls, one of the end walls having an opening formed therein;
a door pivotally suspended on the opening and being configured to pivot inwardly and outwardly relative to the interior compartment to allow ingress and egress thereof;
a pair of lift handles pivotally mounted on the top wall and being sized and configured to facilitate lifting of the cat litter box, the pair of lift handles being generally centered along a length of the top wall and being disposed on opposing sides of a centerline of the top wall, the lift handles being configured to be lockable to the top wall during non-use;
an elongate extension handle pivotally connected to the top wall at an end of the cat litter box opposite the end having the wheels mounted thereto, the extension handle being pivotable against the top wall and being oriented in substantial alignment with the centerline and lockable against the top wall during non-use, the extension handle being sized and configured to be outwardly pivotable from the top wall to facilitate rolling movement of the cat litter box;
a scoop holder mounted on one of the side walls of the upper portion and being sized and configured to support a litter scooping device;
a plurality of vaned vent openings integrally formed in the top wall and being configured to allow ventilation of the interior compartment; and
a ramp element removably mountable to the cat litter box and extending outwardly therefrom adjacent the opening.

17. The cat litter box of claim 16 wherein the extension handle is pivotable through an angle of at least one-hundred-eighty degrees about a pivot axis oriented parallel to a plane defined by the top wall.

18. The cat litter box of claim 16 wherein the extension handle is swivelably attached to the cat litter box.

19. The cat litter box of claim 18 wherein the extension handle is configured to be rotatable through a three-hundred-sixty degree angle about a swivel axis oriented perpendicularly relative to the top wall.

20. The cat litter box of claim 16 wherein the ramp includes a plurality of perforations and being configured to allow cat litter to pass therethrough.

21. A portable cat litter box, comprising:
a lower portion defining an enclosure being open on a top thereof and comprising a bottom wall, a pair of opposing side walls and a pair of opposing end walls, the enclosure being adapted to contain kitty litter therewithin, each one of the side walls including a wheel well extending laterally thereinwardly;
a pair of wheels rotatably mounted to the lower portion in respective ones of the wheel wells and being sized and configured such that outer surfaces of each of the wheels is substantially flush with the lower portion side wall;
a pair of leg members extending downwardly from the bottom wall of the lower portion and being located adjacent respective ones of the side walls at an end of the cat litter box opposite the end having the wheels mounted thereto, the leg members being sized such that the lower portion is oriented substantially level when the cat litter box is supported on a level surface;
an upper portion defining an enclosure being open on a bottom thereof and being hingedly removably attachable to the lower portion such that the top and bottom portions collectively define an interior compartment, the upper portion having a top wall, a pair of opposing side walls and a pair of opposing end walls interconnecting the side walls, one of the end walls having an opening formed therein;
a door pivotally suspended on the opening and being configured to pivot inwardly and outwardly relative to the interior compartment to allow ingress and egress thereof;
a pair of lift handles pivotally mounted on the top wall and being sized and configured to facilitate lifting of the cat litter box, the pair of lift handles being generally centered along a length of the top wall and being disposed on opposing sides of a centerline of the top wall, the lift handles being configured to be lockable to the top wall during non-use; and an elongate extension handle pivotally connected to the top wall at an end of the cat litter box opposite the end having the wheels mounted thereto, the extension handle being pivotable against the top wall and being oriented in substantial alignment with the centerline and lockable against the top wall during non-use, the extension handle being sized and configured to be outwardly pivotable from the top wall to facilitate rolling movement of the cat litter box.

* * * * *